SWITCH FOR PROVIDING A POSITIONAL BINARY NUMBER CODE

Filed Nov. 7, 1962 2 Sheets-Sheet 1

| | BINARY FUNCTION | | | COMPLEMENTARY FUNCTION | | |
|---|---|---|---|---|---|---|
| | TERMINAL NO. | | | | | |
| POS. | 42 | 44 | 46 | 62 | 64 | 66 |
| 1 | 0 | 0 | 0 | 1 | 1 | 1 |
| 2 | 0 | 0 | 1 | 1 | 1 | 0 |
| 3 | 0 | 1 | 0 | 1 | 0 | 1 |
| 4 | 0 | 1 | 1 | 1 | 0 | 0 |
| 5 | 1 | 0 | 0 | 0 | 1 | 1 |
| 6 | 1 | 0 | 1 | 0 | 1 | 0 |
| 7 | 1 | 1 | 0 | 0 | 0 | 1 |
| 8 | 1 | 1 | 1 | 0 | 0 | 0 |

0=OFF 1=ON

INVENTOR.
JAMES G. YOUNG
BY Morris A. Rabkin
ATTORNEY

Nov. 2, 1965 J. G. YOUNG 3,215,790

SWITCH FOR PROVIDING A POSITIONAL BINARY NUMBER CODE

Filed Nov. 7, 1962 2 Sheets-Sheet 2

INVENTOR.
JAMES G. YOUNG
BY Morris B. Rabkin
ATTORNEY 3,215,790

SWITCH FOR PROVIDING A POSITIONAL BINARY NUMBER CODE

James G. Young, Blackwood, N.J., assignor to Radio Corporation of America, a corporation of Delaware Filed Nov. 7, 1962, Ser. No. 235,990
10 Claims. (Cl. 200—11)

This invention relates generally to switches, and more particularly to wafer switches of the type used to convert a decimal constant to a positional number code. The improved switch of the present invention is particularly useful for providing binary representations and their complements simultaneously.

In certain electronic computational systems, it is desired to convert decimal quantities into multi-bit binary codes. Switches of special construction have been devised to perform this function. Some of the switches are of the microswitch type that comprise a ganged arrangement of a plurality of micro-switches that are actuated by cams. Other prior art switches of special construction require the use of unconventional parts. Most of these prior art switches are relatively expensive and bulky, and none is known that provides both a binary code and its complement simultaneously.

It is an object of the present invention to provide an improved switch adapted to convert a decimal constant to a positional number code by means of a novel arrangement of relatively inexpensive, compact wafer switch components.

Another object of the present invention is to provide an improved wafer switch of the type described adapted to convert a decimal constant to a multi-bit binary code and its complement simultaneously.

A further object of the present invention is to provide a novel wafer switch of the type described wherein eight combinations of a six-bit binary code can be provided.

Still a further object of the present invention is to provide an improved wafer switch of the type described that is relatively simple in construction and operation, relatively inexpensive to manufacture, and highly efficient in use.

Briefly, the improved switch of the present invention comprises a wafer type switch employing easily available, compact parts in a novel arrangement. The rotor of the wafer switch comprises a plurality of radially disposed rotor contacts spaced some multiple of a predetermined angle from each other, all angles having their apices at the center of the rotor. The stator contacts that effect electrical contact with the rotor contacts are spaced from each other by distances that are some multiple of two times the aforementioned predetermined angle but exclusive of a multiple of three times the aforementioned predetermined angle. Detent means are provided to position the rotor in a plurality of rest positions spaced from each other three times the aforementioned predetermined angle. In a preferred embodiment of the present invention, the rotor contacts are spaced from each other by multiples of 15 degrees; three stator contacts are spaced from each other every 30 degrees; and detent means are provided to cause the rotor to have eight rest positions, each being spaced 45 degrees from its neighboring position. Rotor contacts and stator contacts are arranged on both sides of the stator and the rotor to provide a binary code on one side of the switch and a complement of the binary code on the other side of the switch.

The novel features of the present invention, both as to its organization and method of operation, as well as additional objects and advantages thereof, will be more readily understood from the following description, when read in connection with the accompanying drawings in which the same reference characters designate similar parts throughout, and in which.

Figures 1, 2, 5:
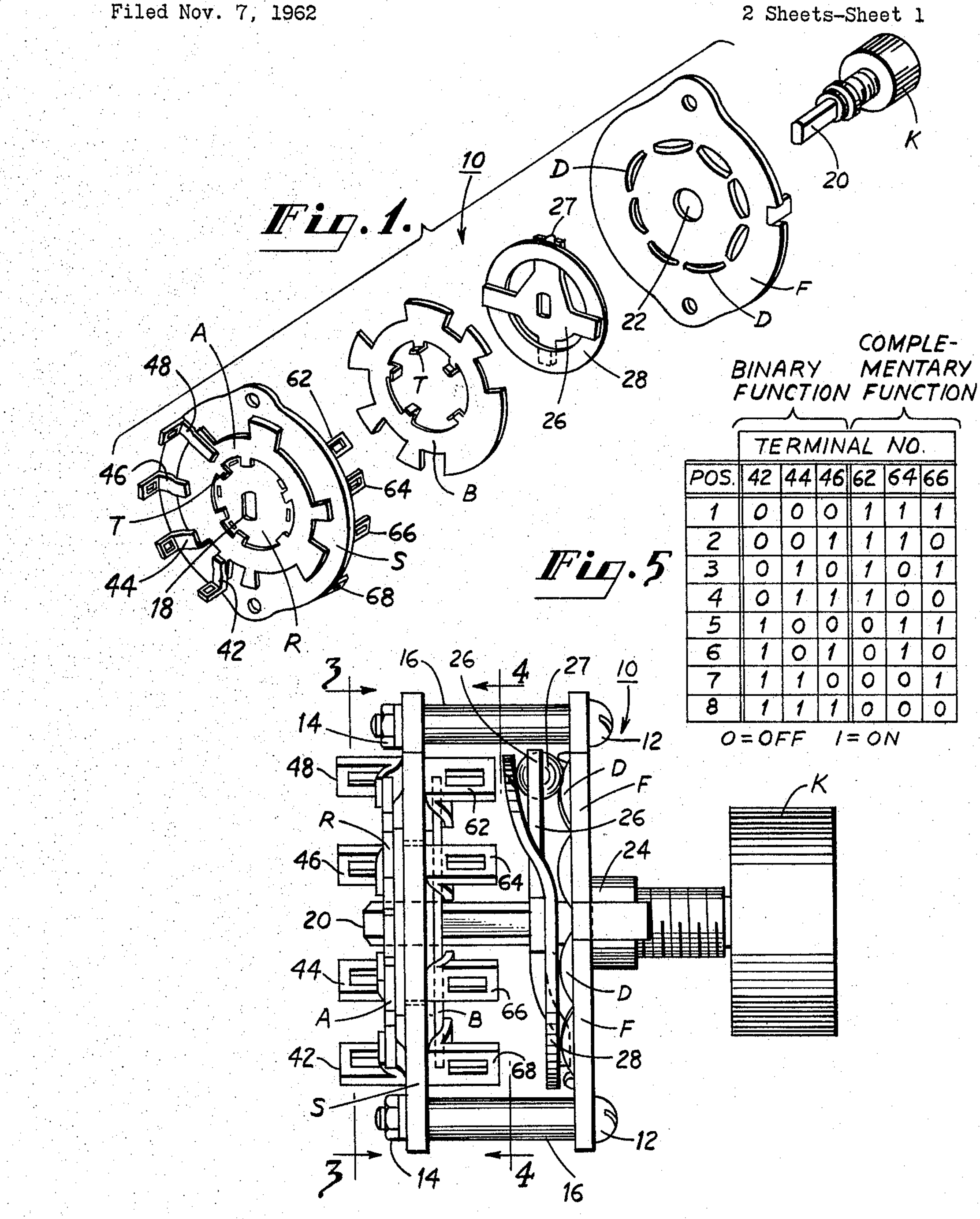
FIG. 1 is an exploded perspective view of one form of the improved switch of the present invention.
FIG. 2 is a side elevational view of the switch shown in FIG. 1, in assembled form.
FIG. 5 is a chart used to explain the binary and complementary functions performed by the embodiment of the switch shown in FIGS. 1, 2, 3, and 4.

Referring, now, particularly to FIGS. 1 and 2 of the drawing, there is shown an improved wafer switch 10 comprising an annular wafer stator S and a disc wafer rotor R, both of insulating material. The rotor R is disposed concentrically within the stator S for rotation therein. The stator S is fixed to an indexing switch frame F by means of screws 12 and nuts 14 and is spaced from the frame F by means of spacers 16. The rotor R is formed with a centrally located, slotted opening 18 that is adapted to receive a somewhat flattened shaft 20 therein for turning the rotor R with respect to the stator S. The shaft 20 extends through an opening 22 in the frame F and through a bushing 24 fixed to the frame F. A knob K is fixed to the rear end of the shaft 20 for rotating the rotor R.

The indexing frame F is formed with a plurality of circumferentially arranged ridges D to provide detent means for positioning the rotor R in eight predetermined rest positions. A bifurcated, cross-like member 26 is fixed to the shaft 20 and a steel ball 27 is captivated between the bifurcations of the member 26. An annular spring member 28 is disposed about the cross-like member 26 so as to provide spring pressure against the ball 27. The ball 27 is disposed to ride on the ridges D and to provide detent rest positions between adjacent ridges D for fixing the rotor R at predetermined rest positions equally spaced from each other. In the embodiment of the switch 10 shown in FIGS. 1, 2, 3, and 4, the indexing frame F is formed with eight ridges D to provide eight, equally spaced rest positions, each 45 degrees from its neighboring or adjacent rest positions.

An annular rotor contact member A of electrically conductive material is fixed to one side, herein called the front side, of the rotor R by means of suitable tabs T in aligned slots in the rotor R for rotation with the rotor R. In a similar manner, a complementary, annular rotor contact member B of electrically conductive material is fixed to the opposite side, the rear side, of the rotor R for rotation with the rotor R. The rotor contact members A and B are insulated from each other by the rotor R.

Rotor contacts extend radially from the annular contact members A and B, the respective rotor contacts being spaced from each other, or having effective contact areas which are spaced from each other, at angles which are a multiple of a predetermined, unit angle. By the term "multiple of a unit angle," as used herein, is meant a unit angle multipled by a whole integer including "one." By way of example, the rotor A shown in FIG. 3 has rotor contacts 30*a*, 30*b*, 32, 34*a*, 34*b*, 36, 38, 40*a*, 40*b*, 40*c*, 40*d* and 40*e* extending radially outwardly from the periphery thereof. The effective contact areas of the various contacts are spaced from each other at angles which are 15° or multiples of 15°. Where adjacent rotor contacts have contact areas which are spaced only 15° from each other (that is, a unit angle of 15° from each other) they may be joined together, as, for example, the contacts 30*a*, 30*b*, or the contacts 40*a*, 40*b*, 40*c*, 40*d* and 40*e*. The actual width of a single rotor contact should be smaller than the smallest angular spacing between adjacent rotor contacts. For example, the width of the rotor contact 32 is about 10°. In the embodiment of the switch 10 shown in FIGS. 1, 2, and 3, the rotor contacts are spaced from each other at angles which are various, selected multiples of 15°. Thus, in a clockwise sense as viewed in FIG. 3, the contacts 30*b*, 32, 34*a*, 34*b*, 36, 38, 40*a*, 40*b*, 40*c*, 40*d* and 40*e* are spaced 15°, 75°, 105°, 120°, 195°, 225°, 255°, 270°, 285°, 300°, and 315° from the rotor contact 30*a*, respectively. Otherwise stated, these eleven contacts are spaced from the rotor contact 30*a* at angles which are 1, 5, 7, 8, 13, 15, 17, 18, 19, 20, and 21 multiples of 15°, respectively, the contact 30*a* being arbitrarily set at 0°.

Means are provided to effect electrical connection with the rotor contacts for providing an output from the switch 10. To this end, a plurality of relatively short stator contacts 42, 44 and 46 are fastened to the front side of the stator S by any suitable means, such as rivets. The stator contacts 42, 44 and 46 are radially disposed with respect to the center of the rotor R and are adapted to be engaged by selected ones of the rotor contacts when the latter are disposed in predetermined positions. An input stator contact 48, which is longer than the contacts 42, 44 and 46, is fixed to the stator S and is adapted to engage the annular contact member A at all times.

Figure 4:
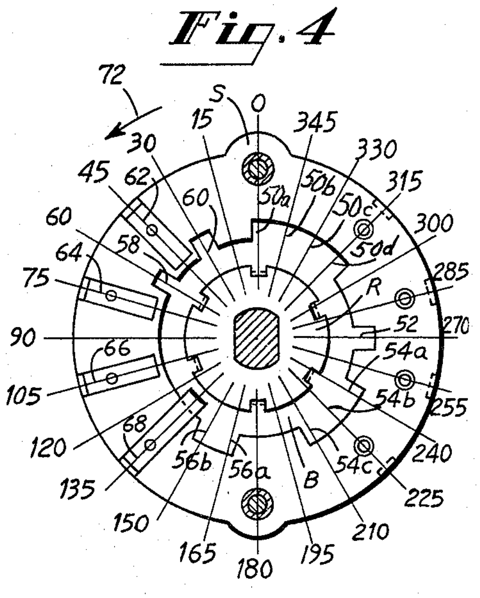
FIG. 4 is a cross-sectional view of the switch taken along the line 4—4 in FIG. 2 and viewed in the direction indicated by the appended arrows.

The annular contact member B is also formed with a plurality of radially disposed rotor contacts which are spaced a multiple of a predetermined angular distance from each other, as shown in FIG. 4. Thus, when considered in a counterclockwise sense in FIG. 4, the contact members 50*b*, 50*c*, 50*d*, 52, 54*a*, 54*b*, 54*c*, 56*a*, 56*b*, 58, and 60 are spaced 345°, 330°, 315°, 270°, 240°, 225°, 210°, 165°, 150°, 60°, and 30° from the rotor contact 50*a*, respectively. In other words, they are spaced from the rotor contact 50*a* at angles which are, respectively, 23, 22, 21, 18, 16, 15, 14, 11, 10, 4 and 2 multiples of 15°, the contact 50*a* being arbitrarily positioned at 0°.

Stator contacts 62, 64 and 66 of relatively short length are fixed to the rear side of the stator S by any suitable means, such as rivets, and are disposed radially with respect to the center of the rotor R. The angular distance between any two stator contacts on each side of the stator S is a multiple of twice the smallest unit angle between the rotor contacts but exclusive of a multiple of three times this smallest angle. That is to say, while the angular distance between any two stator contacts can be a multiple of twice the smallest unit angle between the rotor contacts, it can not, at the same time, also be a multiple of three times this smallest angle. In the embodiment of the invention shown in FIGS. 3 and 4, the stator contacts on each side of the stator S are spaced 30° from each other. A relatively long input stator contact 68 is fixed to the rear surface of the stator S and is adapted to contact the annular portion of the contact member B at all times.

Figure 6:
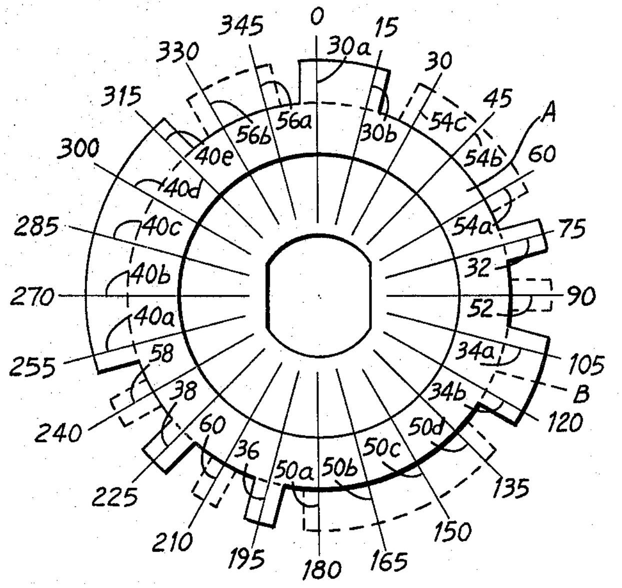
FIG. 6 is a schematic diagram of the front and rear rotor contacts on the rotor of the switch illustrated in FIGS. 1 to 4, the front rotor contacts being disposed between the rear rotor contacts to illustrate the complementary function of the switch.

The complementary functions of the switch 10 result from the novel disposition of the rotor contacts on the front and rear rotor contact members A and B, as shown in FIG. 6. Referring, now, to FIG. 6, there is shown the rotor member A superimposed on the rotor member B in a manner to illustrate that the rotor member B has rotor contacts where the rotor member A lacks contacts, and vice versa. This permits obtaining an output representing the complement of a number at the same time as the primary number output is obtained. When the smallest angular distance between two rotor contacts is 15°, the annular members A and B each support 12 contacts, and the switch 10 can provide an output of either eight three-bit binary number and their complements or eight six-bit binary numbers, depending upon the combination of the outputs from the front and rear stator contacts.

Figure 3:
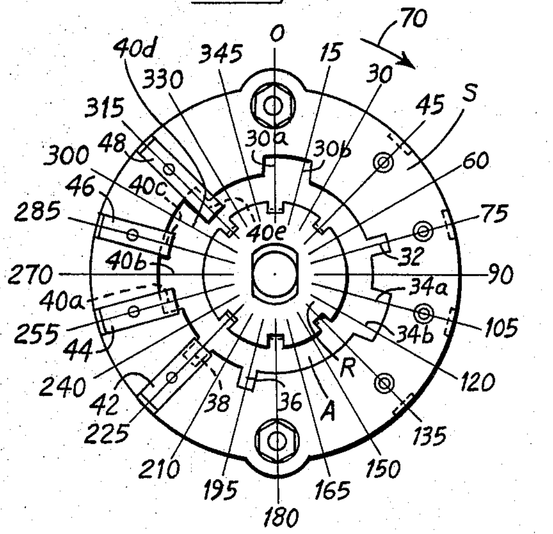
FIG. 3 is a cross-sectional view of the switch taken along the line 3—3 in FIG. 2 and viewed in the direction indicated by the appended arrows.

In the embodiment of the switch 10, the rotor contacts and stator contacts are disposed to provide consecutively eight different three-bit binary outputs and their complements in the eight consecutive rest positions of the switch. The rotor contacts are spaced a multiple of 15° from each other, the stator contacts on each side of the stator S are spaced a multiple of 30° from each other, and the detented rest positions of the rotor are spaced 45° from each other. The positions of the rotor contacts and stator contacts in FIGS. 3 and 4 illustrate the eighth position on the chart shown in FIG. 5. In FIG. 5, the digit "1" represents an electrical connection between a rotor contact and the designated stator contact, and the digit "0" represents no electrical connection to the designated stator contact. Thus, in FIG. 3, the rotor contacts 38, 40*a* and 40*c* are in electrical engagement with the stator contacts 42, 44 and 46, respectively. This position of the switch 10 (position No. 8 of FIG. 5) represents the binary number 111, equivalent to the decimal number seven.

In FIG. 4, none of the rotor contacts makes an electrical connection with any of the stator contacts, 62, 64 and 66. This position of the switch provides a binary output of 000, which is the complement of the binary output 111 from the stator contacts 42, 44 and 46. The switch 10 is arranged so that the rotor contacts are spaced a multiple of a predetermined angle from each other, and so that any two stator contacts on each side of the stator be spaced from each other a multiple of twice the aforementioned angle but exclusive of a multiple of three times the aforementioned angle, and so that the rotor has its rest positions spaced three times the aforementioned angle from each other. Under these conditions, each rotor contact area makes an electrical connection with only one stator contact during one complete revolution of the rotor, when a maximum of three output stator contacts are used on each side of the stator. This results from the aforementioned angular relationship of the switch contacts wherein the rest positions of the rotor are 3X° from each other, and the stator contacts are spaced a multiple of 2X° from each other, but not a multiple of 3X° from each other, X° being the unit or smallest possible angle between rotor contacts.

If the rotor R of the switch 10 is rotated in the direction indicated by the arrows 70 and 72 in FIGS. 4 and 5, respectively, that is, through the eight detented rest positions indicated in FIG. 5, the stator contacts 42, 44, 46, 62, 64 and 66 provide the binary coded outputs indicated by the digits "1" and "0." For example, if the rotor R in FIGS. 4 and 5 is moved 45° in the direction indicated by the arrows 70 and 72, the switch 10 is then in position 1, and no rotor contacts make an electrical connection with the stator contacts 42, 44, 46, but the stator contacts 62, 64 and 66 make an electrical connection with the rotor contacts 58, 60, and 50*a*, respectively. Thus, in position 1, the stator contacts 42, 44 and 46 provide the three-bit binary number 000, and the stator contacts 62, 64 and 66 provide the three-bit binary complement 111. Rotating the rotor R to the other switch positions indicated in FIG. 5 provides the indicated binary coded outputs. It is also within the contemplation of this invention to provide a six-bit binary coded output by combining the outputs from the front and rear stator contacts.

From the foregoing description, it will be apparent that there has been provided an improved wafer switch of the type adapted to convert decimal quantities into multi-bit binary codes. While the switch of the present invention has been illustrated as employing only one rotor and stator, a plurality of such stators and rotors may be disposed on a single shaft. Although the rotor contacts of the illustrated switch are spaced from each other by selected multiples of a unit angle of 15°, the unit angle may be smaller or larger than 15°, depending upon the size and requirements of the switch and the number of positions provided. Also, variations of the switch and components thereof coming within the spirit of this invention will, no doubt, readily suggest themselves to those skilled in the art. Hence, it is desired that the foregoing shall be considered merely as illustrative and not in a limiting sense.

What is claimed is:

1. A switch comprising
(a) a stator formed with a central opening therein,
(b) a rotor disposed concentrically within said central opening and journalled therein for rotation about a center point with respect to said stator,
(c) a plurality of discrete rotor contact areas radially disposed on said rotor,
(d) said rotor contact areas being spaced at selected multiples of an angle of X° from each other, said angle of X° having its apex at said center point,
(e) at least two stator contacts, for contacting selected ones of said rotor contact areas, fixed to said stator and spaced a multiple of an angle of 2X° apart but exclusive of a multiple of an angle of 3X° apart, and
(f) means providing a plurality of rest positions every angle of 3X° for said rotor as said rotor is rotated, all of said angles having their apices at said center point.

2. A wafer switch comprising
(a) a wafer stator formed with a central opening therein,
(b) a wafer rotor disposed concentrically within said central opening and journalled therein for rotation about a center point with respect to said stator,
(c) a plurality of discrete rotor contact areas radially disposed on said rotor,
(d) said rotor contact areas being spaced at selected multiples of an angle of X° from each other, said angle of X° having its apex at said center point,
(e) at least two stator contacts for contacting selected ones of said rotor contact areas, said stator contacts being fixed to said stator and spaced a multiple of an angle of 2X° apart but exclusive of a multiple of an angle of 3X° apart, and
(f) means to rotate said rotor and to provide a plurality of rest positions every angle of 3X° for said rotor, all of said angles having their apices at said center point,
(g) each of said rotor contact areas being disposed to engage a separate one of said stator contacts in only one of said rest positions during one rotation of said rotor.

3. A wafer switch comprising
(a) a wafer stator formed with a central opening therein,
(b) a wafer rotor disposed concentrically within said central opening and journalled therein for rotation about a center point with respect to said stator,
(c) a plurality of discrete rotor contact areas radially disposed on said rotor,
(d) said rotor contact areas being spaced at selected multiples of an angle of X° from each other, said angle of X° having its apex at said center point,
(e) three stator contacts, for contacting selected ones of said rotor contact areas, fixed to said stator,
(f) any two of said stator contacts being spaced a multiple of an angle of 2X° apart but exclusive of a multiple of an angle of 3X° apart, and
(g) means to rotate said rotor and to provide a plurality of rest positions every angle of 3X° for said rotor, all of said angles having their apices at said center point,
(h) each of said rotor contact areas being disposed to engage a separate one of said stator contacts in only one of said rest positions during one rotation of said rotor, and
(i) X° having a value of up to 15°.

4. A wafer switch comprising
(a) a wafer stator formed with a central opening therein,
(b) a wafer rotor disposed concentrically within said central opening of said stator for rotation about a center point with respect to said stator,
(c) two sets of rotor contact areas radially disposed on opposite sides of said rotor, respectively,
(d) said rotor contact areas in each of said sets being spaced at selected multiples of an angle of X° from each other, said angle of X° having its apex at said center point,
(e) two sets of at least two stator contacts for contacting selected ones of said rotor contact areas, said sets of stator contacts being fixed to opposite sides of said stator, respectively,
(f) said stator contacts in each of said sets of stator contacts being spaced a multiple of an angle of 2X° apart but exclusive of a multiple of an angle of 3X° apart,
(g) means to rotate said rotor and to provide a plurality of rest positions every angle of 3X° for said rotor, all of said angles having their apices at said center point,
(h) each of said rotor contact areas in each of said sets of rotor contact areas being disposed to engage a separate one of said stator contacts in each of said sets of stator contacts in only one of said rest positions, respectively, during one rotation of said rotor, and
(i) said rotor contact areas in one of said sets of rotor contact areas being disposed at different multiples of an angle of X° from the rotor contact areas in the other of said sets of rotor contact areas.

5. A switch comprising
(a) a stator formed with a central opening therein,
(b) a wafer rotor disposed concentrically within said central opening of said stator for rotation therein about a center point,
(c) twelve radially disposed rotor contact areas on said rotor,
(d) said rotor contact areas being spaced at selected multiples of an angle of 15° from each other,
(e) at least two stator contacts for contacting selected ones of said rotor contact areas, said stator contacts being fixed to said stator and spaced a multiple of an angle of 30° apart but exclusive of a multiple of an angle of 45° apart, and
(f) means providing a plurality of rest positions every angle of 45° for said rotor as said rotor is rotated, all of said angles having their apices at said center point,
(g) each of said stator contacts being disposed to engage a separate one of said rotor contact areas in only one of said rest positions during one revolution of said rotor.

6. A wafer switch comprising
(a) a wafer stator formed with a central opening therein,
(b) a wafer rotor disposed concentrically within said central opening of said stator for rotation about a center point with respect thereto,
(c) twelve radially disposed rotor contact areas on said rotor,
(d) said rotor contact areas being spaced at selected multiples of an angle of 15° from each other,
(e) three stator contacts for contacting selected ones of said rotor contact areas fixed to said stator and spaced a multiple of an angle of 30° apart from each other, and
(f) means to rotate said rotor and to provide a plurality of rest positions every 45° for said rotor, all of said angles having their apices at said center point,
(g) each of said stator contacts being disposed to engage a separate one of said rotor contact areas in only one of said rest positions during one revolution of said rotor.

7. A switch comprising
(a) means providing at least two stationary stator contacts and rotatable rotor contact areas for effecting electrical connection therewith, and
(b) means for rotating said rotor contact areas about a center point and providing a plurality of rest positions thereof so that said rotor contact areas effect electrical connections with said stator contacts at predetermined rest positions,
(c) said rotor contact areas being spaced at selected multiples of an angle of X° from each other,
(d) said stator contacts being spaced from each other at selected multiples of an angle of 2X° but exclusive of multiples of an angle of 3X°, and
(e) said rest positions being spaced at an angle of 3X° apart, all of said angles having their apices at said center point.

8. A wafer switch comprising
(a) means providing three stationary stator contacts and twelve rotatable rotor contact areas for effecting electrical connection therewith, and
(b) means for rotating said rotor contact areas about a center point and providing eight rest positions thereof so that said rotor contact areas are brought into electrical engagement with said stator contacts at predetermined rest positions,
(c) said rotor contact areas being spaced from each other at an angle of X°,
(d) any two of said stator contacts being spaced from each other at an angle of 2X° but exclusive of an angle of 3X°, and
(e) said rest positions being spaced an angle of 3X° apart, all of said angles having their apices at said center point.

9. A wafer switch comprising
(a) a stator formed with a central opening therein,
(b) a rotor disposed concentrically within said central opening of said stator for rotation about a center point with respect thereto,
(c) two sets of three stationary stator contacts and two sets of twelve rotatable rotor contact areas for effecting electrical connection therewith on opposite sides of said stator and said rotor, respectively,
(d) means for rotating said rotor contact areas, and
(e) means providing a plurality of rest positions for said rotor contact areas so that said rotor contacts effect electrical connections with said stator contacts at predetermined rest positions,
(f) said rotor contact areas being spaced from each other at selected multiples of an angle of X°,
(g) any two of said stator contacts on each of said sides of said stator being spaced from each other at selected multiples of an angle of 2X° but exclusive of multiples of an angle of 3X°,
(h) said rest positions being spaced an angle of 3X° apart, all of said angles having their apices at said center point, and
(i) said stator contacts and said rotor contact areas on one of said sides of said stator and said rotor providing a three-bit binary code, and said stator contacts and said rotor contact areas on the opposite side of said stator and said rotor providing the complement of said three-bit binary code.

10. A wafer switch comprising
(a) a stator formed with a central opening therein,
(b) a rotor disposed concentrically within said central opening of said stator for rotation about a center point with respect thereto,
(c) two sets of three stationary stator contacts and two sets of twelve rotatable rotor contact areas for effecting electrical connection therewith on opposite sides of said stator and said rotor, respectively,
(d) means for rotating said rotor contact areas, and
(e) means providing eight rest positions so that said rotor contact areas engage with said stator contacts at predetermined rest positions,
(f) said rotor contact areas in each of said sets of rotor contact areas being spaced from each other at selected multiples of an angle of 15°,
(g) each of said stator contacts in each of said sets of stator contacts being spaced from each other a multiple of an angle of 30° but exclusive of a multiple of an angle of 45°,
(h) said rest positions being spaced an angle of 45° apart, all of said angles having their apices at said center point, and
(i) each of said rotor contact areas in each of said sets of rotor contact areas being disposed to make contact with only one of said stator contacts in only one of said rest positions during one revolution of said rotor.

References Cited by the Examiner

UNITED STATES PATENTS

| | | | |
|---|---|---|---|
| 2,476,673 | 7/49 | May et al. | 318—33 |
| 2,650,960 | 9/53 | Allison | 200—15 |
| 2,796,574 | 6/57 | Hatfield | 200—15 X |
| 2,828,393 | 3/58 | Wingard | 200—166 |
| 2,900,461 | 8/59 | Allison | 200—11 |
| 2,900,462 | 8/59 | Thomas et al. | 200—15 X |
| 2,949,511 | 8/60 | Glueckstein et al. | 200—15 X |

FOREIGN PATENTS

| | | |
|---|---|---|
| 225,980 | 10/59 | Australia. |

BERNARD A. GILHEANY, *Primary Examiner.*